United States Patent
Franci Rodon et al.

(10) Patent No.: US 11,561,613 B2
(45) Date of Patent: Jan. 24, 2023

(54) DETERMINING ANGULAR ACCELERATION

(71) Applicant: Magic Leap, Inc., Plantation, FL (US)

(72) Inventors: Arnau Franci Rodon, San Francisco, CA (US); Omid Ghasemalizadeh, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/332,917

(22) Filed: May 27, 2021

(65) Prior Publication Data

US 2021/0373654 A1    Dec. 2, 2021

Related U.S. Application Data

(60) Provisional application No. 63/031,985, filed on May 29, 2020.

(51) Int. Cl.
| | | |
|---|---|---|
| G06F 3/01 | (2006.01) | |
| G01P 15/16 | (2013.01) | |
| G01P 15/08 | (2006.01) | |

(52) U.S. Cl.
CPC .............. G06F 3/012 (2013.01); G01P 15/08 (2013.01); G01P 15/165 (2013.01); G06F 3/011 (2013.01)

(58) Field of Classification Search
CPC .......... G06F 3/012; G06F 3/011; G01P 15/08; G01P 15/165
See application file for complete search history.

(56) References Cited

U.S. PATENT DOCUMENTS

| | | | |
|---|---|---|---|
| 4,852,988 A | 8/1989 | Velez | |
| 5,933,125 A * | 8/1999 | Fernie | G02B 27/017 |
| | | | 345/643 |
| 6,433,760 B1 | 8/2002 | Vaissie | |
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |

(Continued)

FOREIGN PATENT DOCUMENTS

| | | |
|---|---|---|
| CA | 2316473 A1 | 1/2001 |
| CA | 2362895 A1 | 12/2002 |

(Continued)

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

(Continued)

*Primary Examiner* — Mihir K Rayan

(74) *Attorney, Agent, or Firm* — Morrison & Foerster LLP

(57) ABSTRACT

Disclosed herein are systems and methods for calculating angular acceleration based on inertial data using two or more inertial measurement units (IMUs). The calculated angular acceleration may be used to estimate a position of a wearable head device comprising the IMUs. Virtual content may be presented based on the position of the wearable head device. In some embodiments, a first IMU and a second IMU share a coincident measurement axis.

17 Claims, 13 Drawing Sheets

(56) References Cited

U.S. PATENT DOCUMENTS

| | | |
|---|---|---|
| 8,235,529 B1 | 8/2012 | Raffle |
| 8,611,015 B2 | 12/2013 | Wheeler |
| 8,638,498 B2 | 1/2014 | Bohn et al. |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,720,505 B2 | 8/2017 | Gribetz et al. |
| 10,013,053 B2 | 7/2018 | Cederlund et al. |
| 10,025,379 B2 | 7/2018 | Drake et al. |
| 11,328,475 B2 | 5/2022 | Huang et al. |
| 2003/0030597 A1 | 2/2003 | Geist |
| 2006/0023158 A1 | 2/2006 | Howell et al. |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0078570 A1* | 3/2012 | Rothkopf ............ G01C 19/58 702/141 |
| 2014/0195918 A1 | 7/2014 | Friedlander |
| 2015/0168731 A1 | 6/2015 | Robbins |
| 2016/0364013 A1 | 12/2016 | Katz et al. |
| 2016/0364904 A1* | 12/2016 | Parker ............ G06F 3/038 |
| 2017/0084074 A1 | 3/2017 | Hwang |
| 2019/0096081 A1 | 3/2019 | Gupta |
| 2019/0197196 A1 | 6/2019 | Yang |
| 2019/0227693 A1* | 7/2019 | Liao ............ G06F 3/012 |
| 2020/0039522 A1 | 2/2020 | Nakaoka et al. |
| 2021/0118218 A1* | 4/2021 | Huang ............ G01C 19/00 |
| 2022/0230382 A1 | 7/2022 | Huang et al. |

FOREIGN PATENT DOCUMENTS

| | | |
|---|---|---|
| CA | 2388766 A1 | 12/2003 |
| WO | 2019164498 A1 | 8/2019 |
| WO | 2021077024 A1 | 4/2021 |
| WO | 2021243103 A1 | 12/2021 |

OTHER PUBLICATIONS

Azuma, Ronald T. (Feb. 1995). "Predictive Tracking for Augmented Reality," Department of Computer Science, UNC—Chapel Hill, Chapel Hill, NC, 262 pages. (Submit in two parts).

International Search Report and Written Opinion dated Jan. 21, 2021, for PCT Application No. PCT/US20/56163, filed Oct. 16, 2020, thirteen pages.

Notice of Allowance dated Mar. 22, 2022, for U.S. Appl. No. 17/072,825, filed Oct. 16, 2020, nine pages.

Non-Final Office Action dated Nov. 24, 2021, for U.S. Appl. No. 17/072,825, filed Oct. 16, 2020, six pages.

International Search Report and Written Opinion dated Aug. 31, 2021, for PCT Application No. PCT/US2021/34647, filed May 27, 2021, 13 pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al., (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

International Preliminary Report on Patentability and Written Opinion dated Apr. 28, 2022, for PCT Application No. PCT/US/2020/056163, filed Oct. 16, 2020, eight pages.

* cited by examiner

DETERMINING ANGULAR ACCELERATION

CROSS-REFERENCE TO RELATED APPLICATIONS

This application claims benefit of U.S. Provisional Application No. 63/031,985, filed May 29, 2020, the contents of which are incorporated herein by reference in their entirety.

FIELD

This disclosure relates in general to systems and methods for mapping and displaying visual information, and in particular to systems and methods for mapping and displaying visual information in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment that overlaps or overlays the real environment can be difficult. For example, mixing a virtual environment with a real environment can require a complex and thorough understanding of the real environment such that objects in the virtual environment do not conflict with objects in the real environment. It can further be desirable to maintain a persistency in the virtual environment that corresponds with a consistency in the real environment. For example, it can be desirable for a virtual object displayed on a physical table to appear at the same location even if a user looks away, moves around, and then looks back at the physical table. To achieve this type of immersion, it can be beneficial to develop an accurate and precise estimate of where objects are in the real world and where a user is in the real world.

BRIEF SUMMARY

Disclosed herein are systems and methods for calculating angular acceleration based on inertial data using two or more inertial measurement units (IMUs). The calculated angular acceleration may be used to estimate a position of a wearable head device comprising the IMUs. Virtual content may be presented based on the position of the wearable head device. In some embodiments, a first IMU and a second IMU share a coincident measurement axis.

In some embodiments, a system comprises: a first inertial measurement unit; a second inertial measurement unit; and one or more processors configured to execute a method comprising: receiving first inertial data via the first inertial measurement unit; receiving second inertial data via the second inertial measurement unit; calculating an angular acceleration based on the first inertial data and based further on the second inertial data; estimating a first position of a wearable head device based on the angular acceleration; and presenting virtual content based on the first position of the wearable head device.

In some embodiments, the first inertial measurement unit and the second inertial measurement unit share a coincident measurement axis.

In some embodiments, the system further comprises a third inertial measurement unit that does not share the coincident measurement axis with the first inertial measurement unit and the second inertial measurement unit.

In some embodiments, the method further comprises: generating third inertial data via the third inertial measurement unit, wherein the angular acceleration is calculated further based on the third inertial data.

In some embodiments, estimating the first position of the wearable head device based on the angular acceleration comprises calculating a pre-integration term based on the angular acceleration.

In some embodiments, the pre-integration term relates a first state of the wearable head device to a second state of the wearable head device, and wherein each state comprises respective position data, respective velocity data, respective accelerometer bias data, and respective gyroscope bias data.

In some embodiments, the method further comprises: predicting a future position of the wearable head device based on the angular acceleration and based further on the first position of the wearable head device; and updating presentation of the virtual content based on the future position of the wearable head device.

In some embodiments, a method comprises: receiving first inertial data via a first inertial measurement unit; receiving second inertial data via a second inertial measurement unit; calculating an angular acceleration based on the first inertial data and based further on the second inertial data; estimating a first position of a wearable head device based on the angular acceleration; and presenting virtual content based on the first position of the wearable head device.

In some embodiments, the first inertial measurement unit and the second inertial measurement unit share a coincident measurement axis.

In some embodiments, the method further comprises generating third inertial data via a third inertial measurement unit that does not share the coincident measurement axis with the first inertial measurement unit and the second inertial measurement unit.

In some embodiments, the angular acceleration is calculated further based on the third inertial data.

In some embodiments, estimating the first position of the wearable head device based on the angular acceleration comprises calculating a pre-integration term based on the angular acceleration.

In some embodiments, the pre-integration term relates a first state of the wearable head device to a second state of the wearable head device, and wherein each state comprises respective position data, respective velocity data, respective accelerometer bias data, and respective gyroscope bias data.

In some embodiments, the method further comprises: predicting a future position of the wearable head device based on the angular acceleration and based further on the first position of the wearable head device; and updating presentation of the virtual content based on the future position of the wearable head device.

In some embodiments, a non-transitory computer-readable medium storing one or more instructions, which, when executed by one or more processors of an electronic device, cause the one or more processors to perform a method comprising: receiving first inertial data via a first inertial measurement unit; receiving second inertial data via a second inertial measurement unit; calculating an angular acceleration based on the first inertial data and based further on the second inertial data; estimating a first position of a wearable head device based on the angular acceleration; and presenting virtual content based on the first position of the wearable head device.

In some embodiments, the first inertial measurement unit and the second inertial measurement unit share a coincident measurement axis.

In some embodiments, the method further comprises generating third inertial data via a third inertial measurement unit that does not share the coincident measurement axis with the first inertial measurement unit and the second inertial measurement unit.

In some embodiments, the angular acceleration is calculated further based on the third inertial data.

In some embodiments, estimating the first position of the wearable head device based on the angular acceleration comprises calculating a pre-integration term based on the angular acceleration.

In some embodiments, the pre-integration term relates a first state of the wearable head device to a second state of the wearable head device, and wherein each state comprises respective position data, respective velocity data, respective accelerometer bias data, and respective gyroscope bias data.

In some embodiments, the method further comprises: predicting a future position of the wearable head device based on the angular acceleration and based further on the first position of the wearable head device; and updating presentation of the virtual content based on the future position of the wearable head device.

DETAILED DESCRIPTION

Figure 1A:
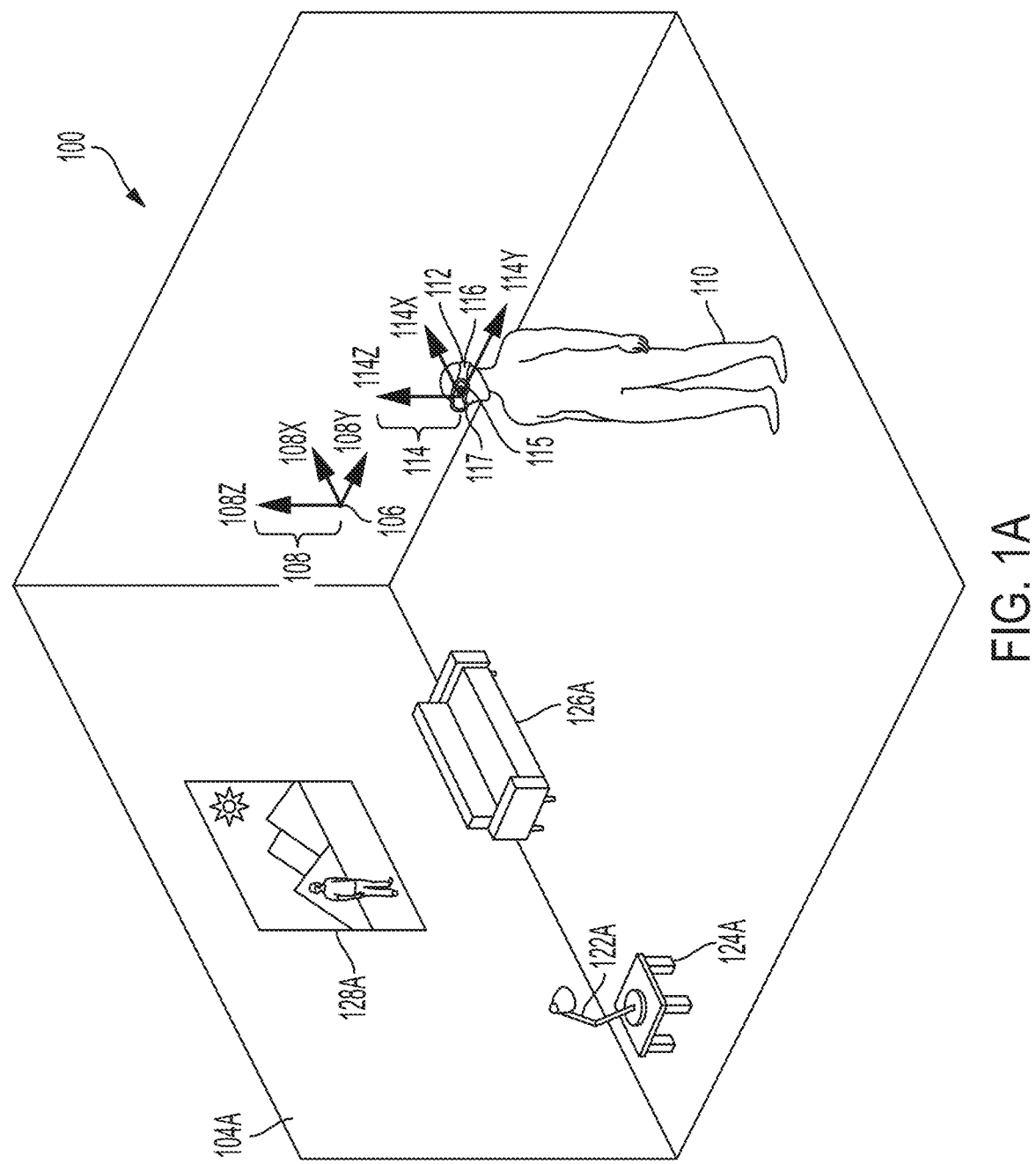
FIGS. 1A-1C illustrate exemplary mixed reality environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
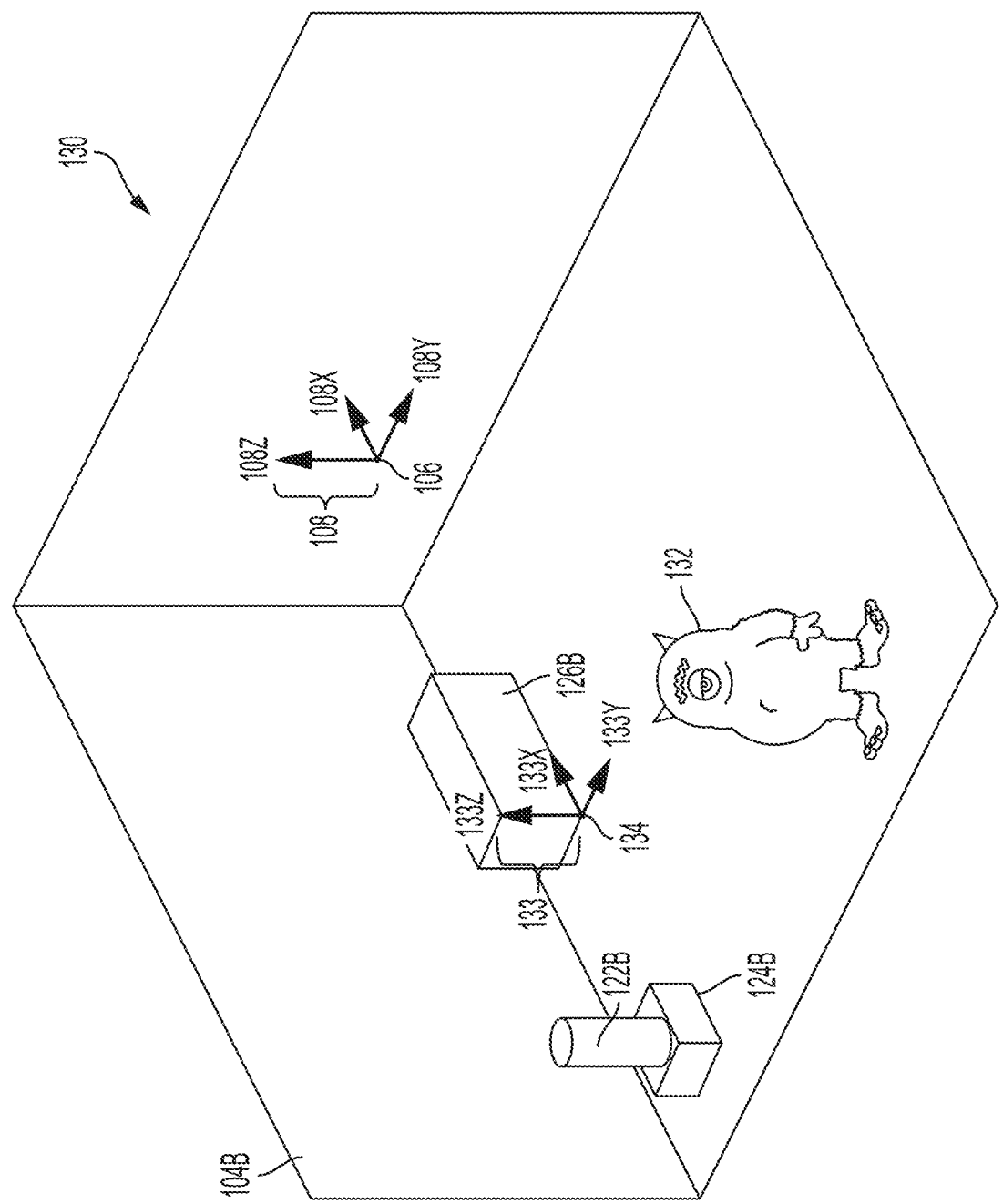

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/ world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
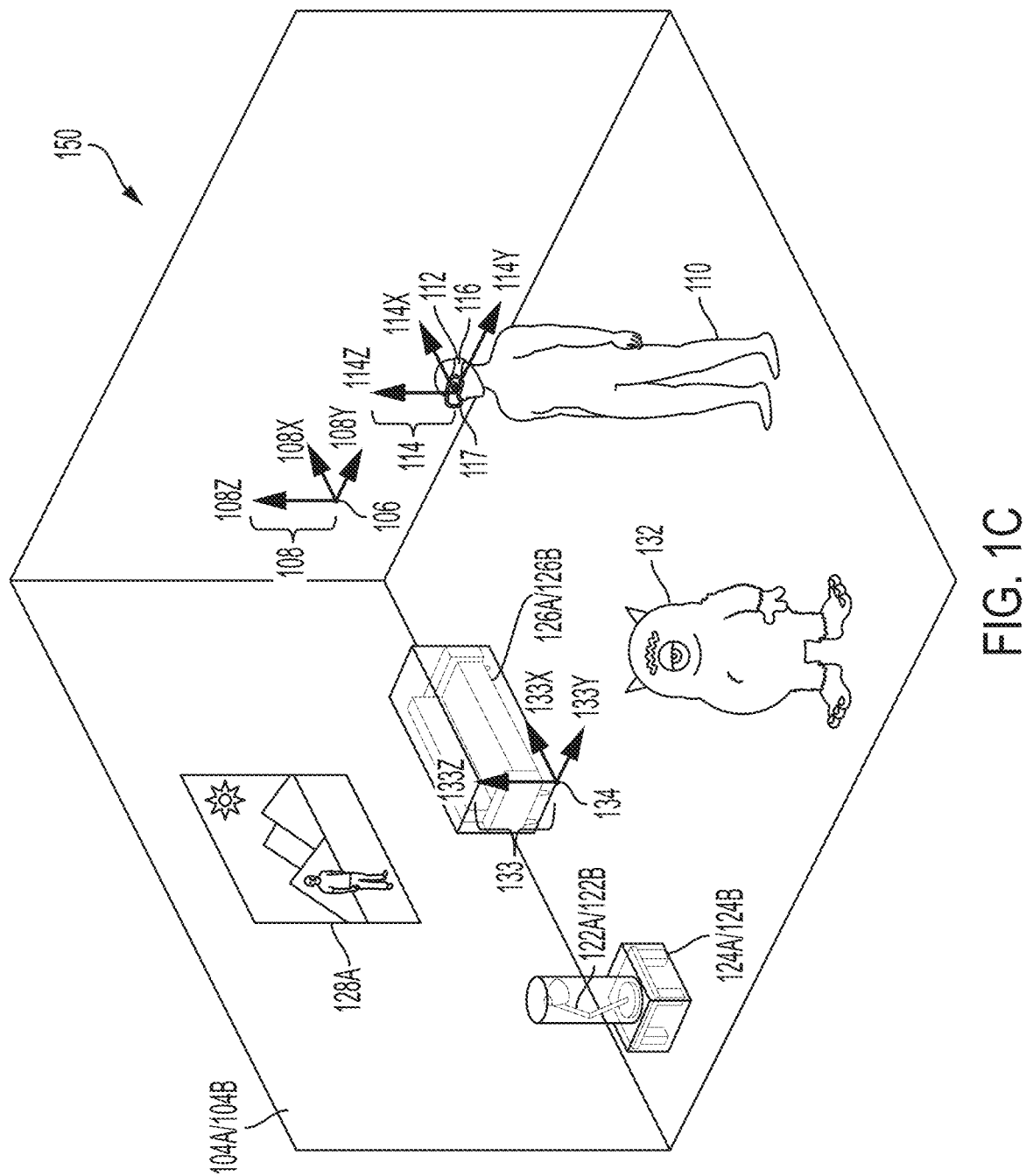

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

Figure 2A:
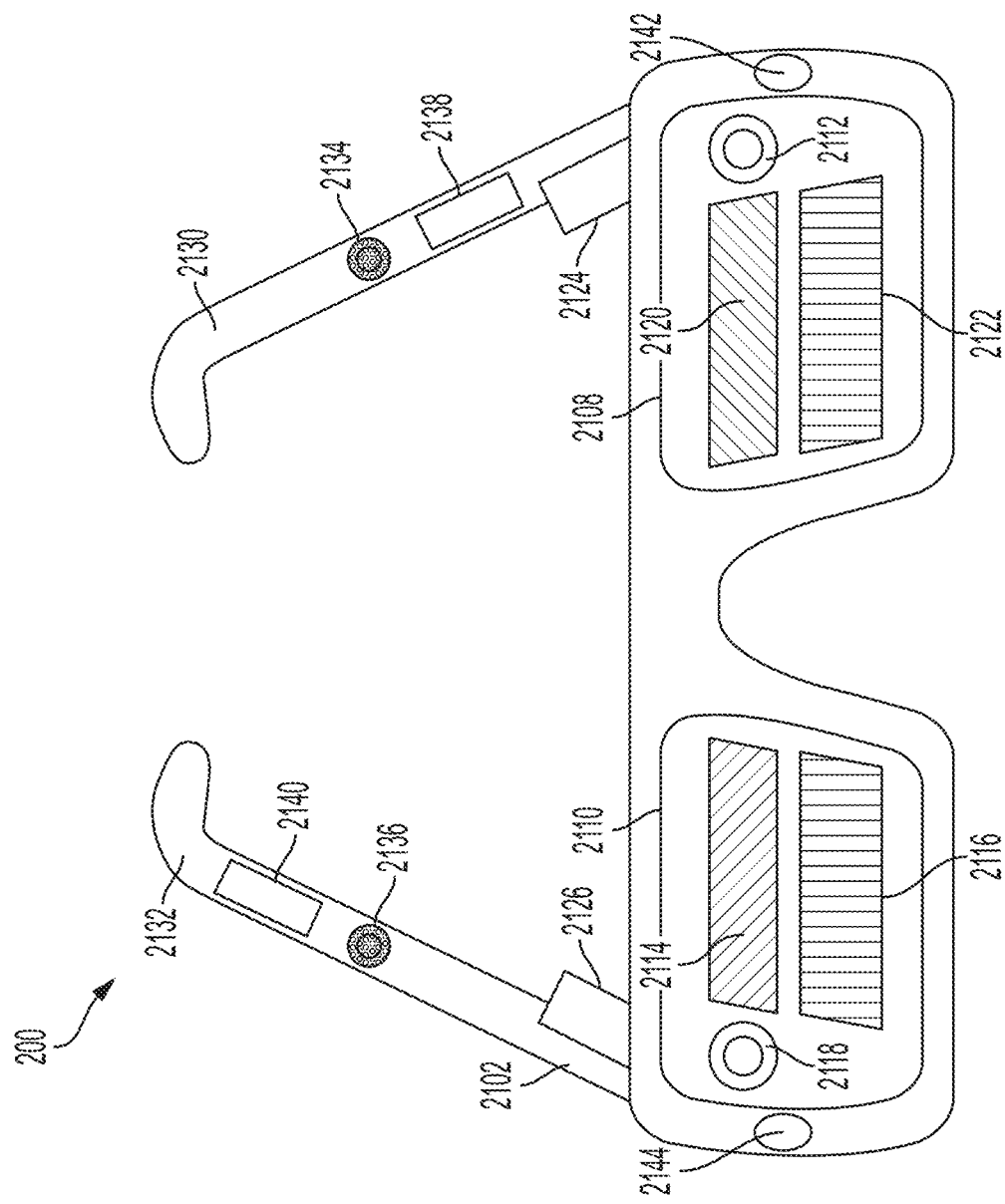
FIGS. 2A-2D illustrate components of an exemplary mixed reality systems, according to embodiments of the disclosure.
Figure 2B:
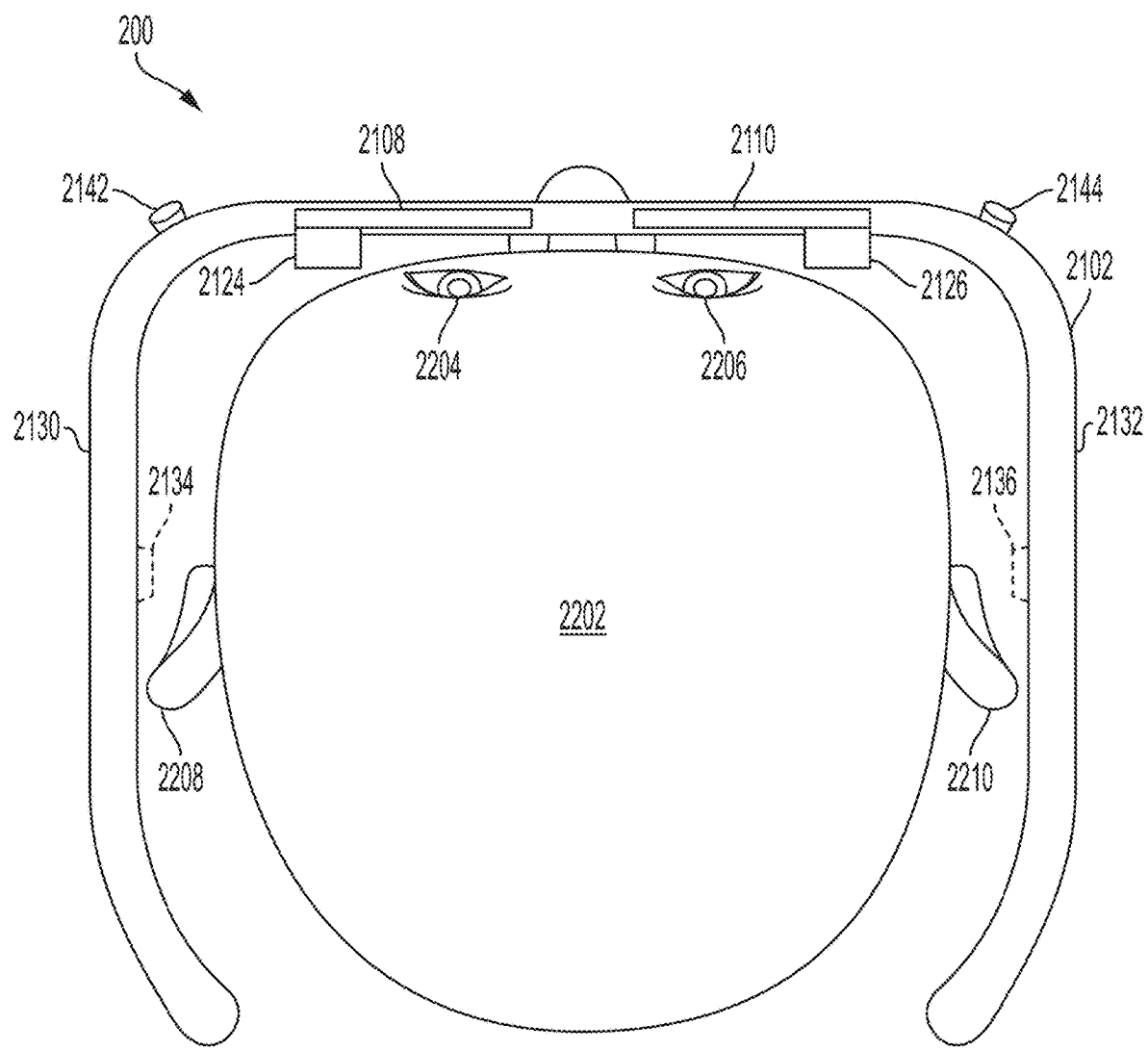
Figure 2C:
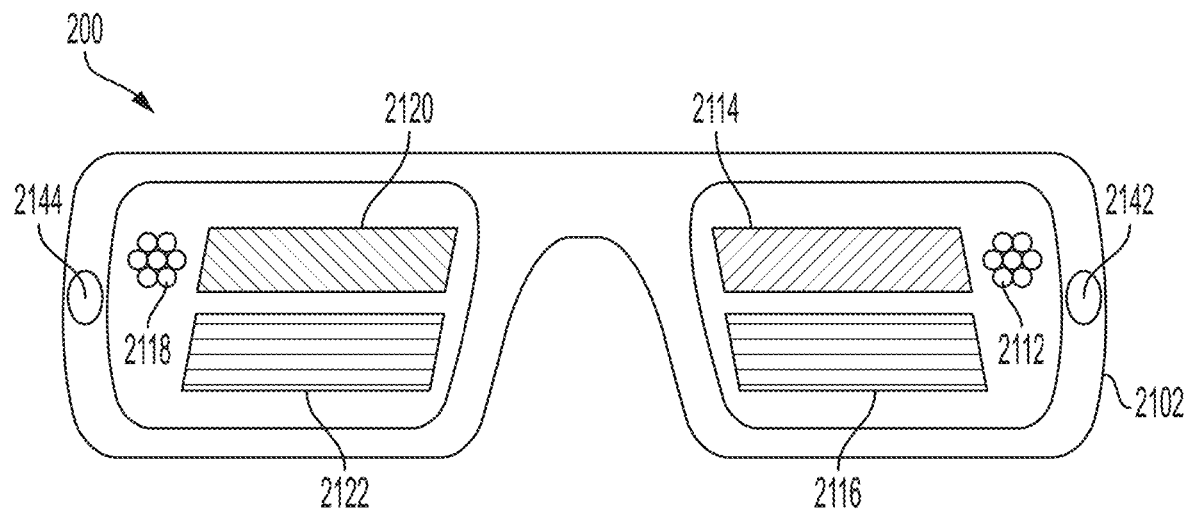
Figure 2D:
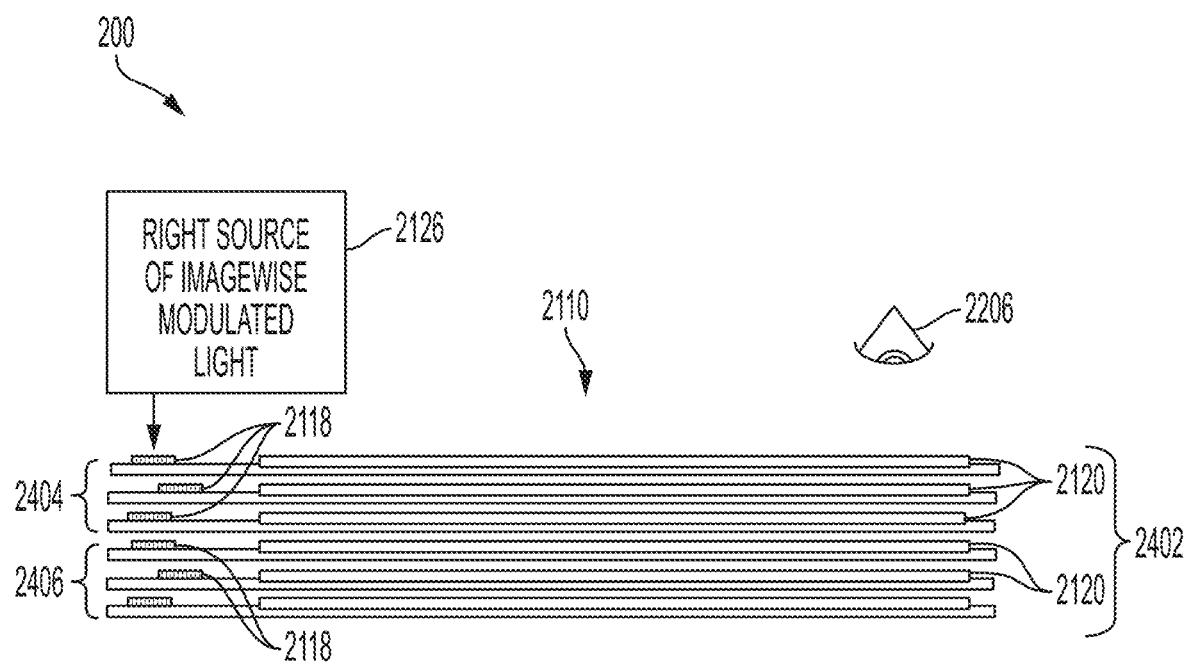

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue, and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
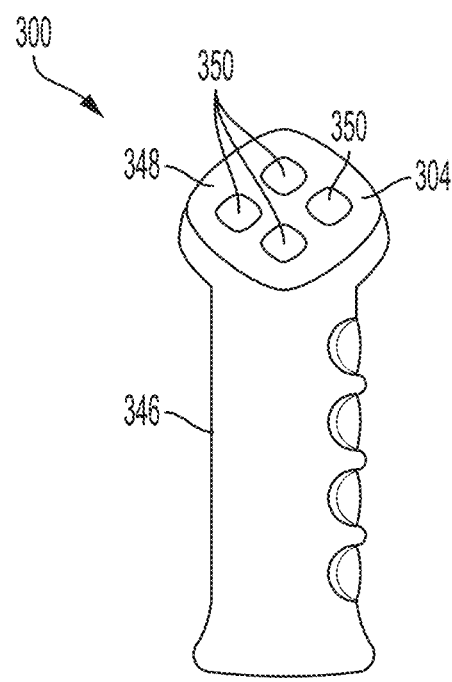
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
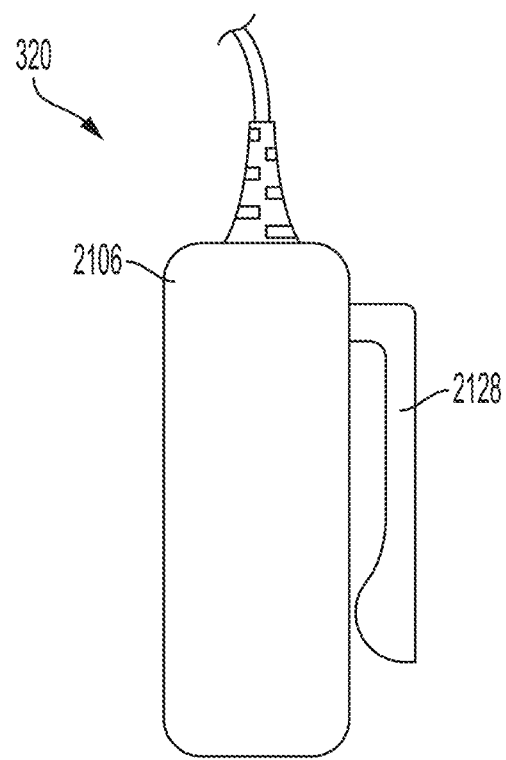
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
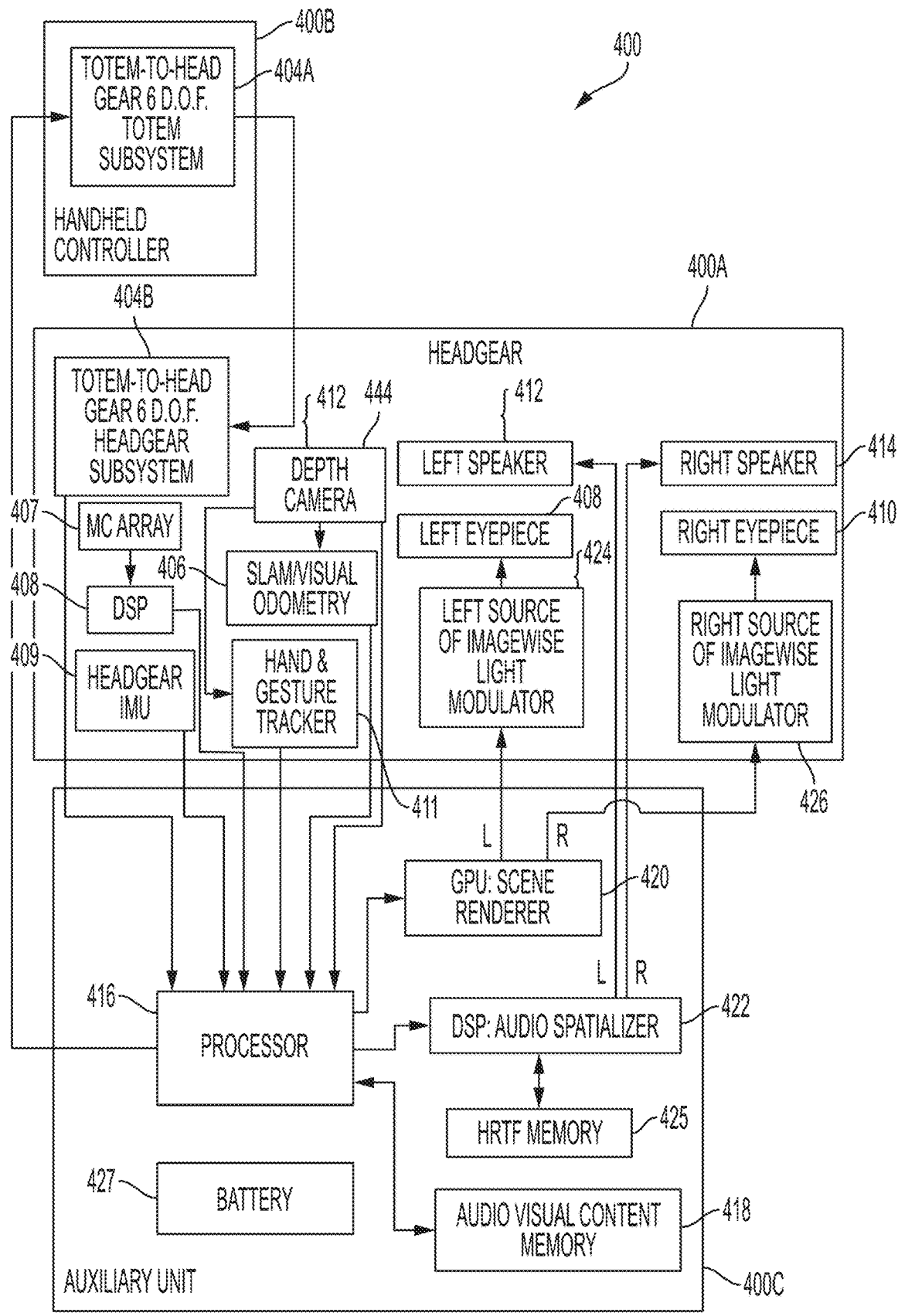
FIG. 4 illustrates an exemplary functional block diagram of an exemplary mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Simultaneous Localization and Mapping

Displaying virtual content in a mixed reality environment such that the virtual content corresponds to real content may be challenging. For example, it can be desirable to display a virtual object 122B in FIG. 1C in the same location as real object 122A. To do so can involve a number of capabilities of mixed reality system 112. For example, mixed reality system 112 may create a three-dimensional map of real environment 104A and real objects (e.g., lamp 122A) within real environment 104A. Mixed reality system 112 may also establish its location within real environment 104A (which can correspond to a user's location within the real environment). Mixed reality system 112 may further establish its orientation within real environment 104A (which can correspond to a user's orientation within the real environment). Mixed reality system 112 may also establish its movement relative to real environment 104A, for example, linear and/or angular velocity and linear and/or angular acceleration (which can correspond to a user's movement relative to the real environment). SLAM can be one method to display a virtual object 122B in the same location as real object 122A even as a user 110 moves around room 104A, looks away from real object 122A, and looks back at real object 122A.

It can be further desirable to run SLAM in an accurate, but computationally efficient and low-latency manner. As used herein, latency can refer to the time delay between a change in a position (e.g., location and/or orientation) of a component of a mixed reality system (e.g., a rotation of a wearable head device), and the reflection of that change as represented in the mixed reality system (e.g., a display angle of a field of view presented in a display of the wearable head device). Inaccurate SLAM calculations and/or high latency performance may negatively impact a user's experience with mixed reality system 112. For example, if a user 110 looks around room 104A, virtual objects may appear to "jitter" as a result of the user's motion, inaccurate SLAM calculations, and/or high latency. Similarly, virtual objects may appear to "drift" over time if SLAM calculations are not accurate. A "drifting" object can be a virtual object that appears to move and/or shift position relative to environment 100 when the virtual object is intended to remain stationary relative to environment 100. Accuracy can therefore be critical to produce an immersive mixed reality environment, otherwise virtual content that conflicts with real content may remind a user of the distinction between virtual and real content and diminish the immersion of the user. Further, in some cases, latency can result in motion sickness, headaches, or other negative physical experiences for some users. It can therefore be desirable to develop systems and methods for increasing SLAM accuracy and/or reducing latency (e.g., in rendering virtual content at appropriate locations to create the illusion of virtual object persistence).

One method can include calculating an angular acceleration of mixed reality system 112. Angular acceleration can be an additional measurement that can be combined with other measurements (such as linear acceleration, linear velocity, and/or angular velocity) to more accurately compute SLAM calculations. Angular acceleration can also be used to anticipate a future position of mixed reality system 112 so that virtual content can be pre-rendered before it is actually needed. This pre-rendering can reduce a perceived latency by a user of mixed reality system 112.

However, directly measuring angular acceleration can require additional hardware that may not be included in all inertial measurement units ("IMUs"). Adding additional hardware to a mixed reality system may be burdensome. For example, a mixed reality system may have power demands due to the large amount of sensors and/or processors, but users of a mixed reality system can also demand portability and long battery life. Adding more complex sensors may also undesirably increase a cost of a mixed reality system. It can therefore be beneficial to develop systems and methods for calculating angular acceleration using two or more IMUs. In some embodiments, data from two IMUs that can each directly measure linear acceleration and/or angular velocity along three axes may not be sufficient to calculate an angular acceleration of a mixed reality system along all three axes. In some embodiments, two such IMUs may be configured such that a measurement axis from a first IMU is coincident with a measurement axis of a second IMU. In some embodiments, this IMU configuration may allow for calculation of angular acceleration, directly or indirectly, along two axes where a measurement axis is not coincident with another IMU.

Figure 5:
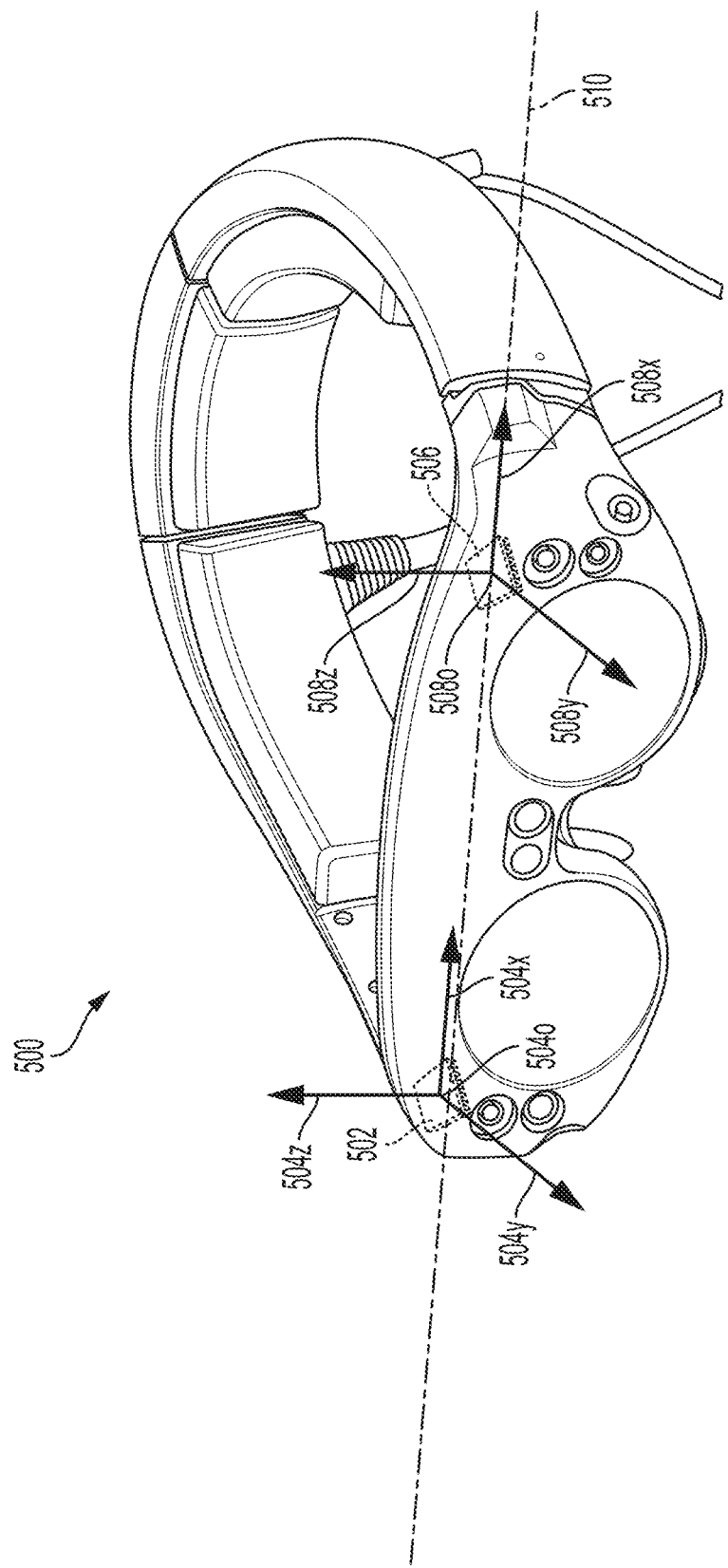
FIG. 5 illustrates an exemplary IMU configuration, according to embodiments of the disclosure.

FIG. 5 illustrates an IMU configuration on a mixed reality system, according to some embodiments. MR system 500 (which can correspond to MR system 112, 200) can include IMU 502 and IMU 506. In some embodiments, IMU 502 and IMU 506 can be configured to obtain measurements along three axes. For example, IMU 502 may be configured to obtain measurements along measurement axes 504$x$, 504$y$, and 504$z$. Similarly, IMU 506 can be configured to obtain measurements along measurement axes 508$x$, 508$y$, and 508$z$. In some embodiments, IMU 502 and/or IMU 506 can be configured to directly measure linear acceleration (e.g., via an accelerometer) and/or angular velocity (e.g., via a gyroscope) about each measurement axis. In some embodiments, IMU 502 and/or IMU 506 may not include hardware configured to directly measure angular acceleration about any measurement axis (e.g., the IMU may not additionally include hardware that is specifically configured to measure angular acceleration).

In some embodiments, IMU 502 and IMU 506 may be rigidly coupled to each other. For example, IMU 502 and IMU 506 may be connected via a rigid structure that has minimal flex and is not configured to move and/or deform. Regardless of how MR system 500 moves and/or rotates, a rigid coupling assumes that IMU 502 and IMU 506 will always maintain the same (or substantially the same) relative positions to each other. A rigid coupling can reduce degrees of freedom between IMU 502 and IMU 506, which can be used to calculate angular acceleration. Equation (1) describes angular acceleration ($\vec{\alpha}$) in terms of linear acceleration ($\vec{a}$), angular velocity ($\vec{\omega}$), and a vector describing a position of IMU 506 relative to IMU 502 ($\vec{r}$), assuming IMU 506 and IMU 502 are rigidly coupled. In some embodiments, ($\vec{r}$) can represent a vector from point 504$o$ to point 508$o$.

$$\vec{\alpha} \times \vec{r} = \vec{a}_{IMU\,506} - \vec{a}_{IMU\,502} - \vec{\omega} \times (\vec{\omega} \times \vec{r}) \qquad \text{Equation 1}$$

Expanded to three dimensions, equation (1) yields a system of equations (2), (3), and (4).

$$-r_y\alpha_z - r_z\alpha_y = (a_{x_{IMU\,506}} - a_{x_{IMU\,502}}) - r_x(\omega_y^2 + \omega_z^2) + r_y(\omega_x\omega_y) + r_z(\omega_y\omega_z) \qquad \text{Equation (2)}$$

$$r_x\alpha_z - r_z\alpha_x = (a_{y_{IMU\,506}} - a_{y_{IMU\,502}}) + r_x(\omega_x\omega_y) - r_y(\omega_x^2 + \omega_z^2) + r_z(\omega_y\omega_z) \qquad \text{Equation (3)}$$

$$-r_x\alpha_y + r_y\alpha_x = (a_{z_{IMU\,506}} - a_{z_{IMU\,502}}) + r_x(\omega_x\omega_z) + r_y(\omega_y\omega_z) - r_z(\omega_x^2 + \omega_y^2) \qquad \text{Equation (4)}$$

Equations (2), (3), and (4) represent a linearly dependent system, which may include more than one solution. However, in some embodiments, IMU 502 and IMU 506 can be configured to resolve angular acceleration along two measurement axes. For example, FIG. 5 depicts an embodiment where measurement axis 504x is coincident with measurement axis 508x. As used herein, coincident axes can refer to two lines (e.g., measurement axis 504x and measurement axis 508x) being collinear (e.g., along axis 510). In some embodiments, configuring a placement for IMU 502 and a placement for IMU 506 such that at least one measurement axis from each IMU is coincident with another measurement axis from the other IMU can reduce a number of unknown variables in equations (2), (3), and (5). In the configuration depicted in FIG. 5, the vector ($\vec{r}$) can be represented as equation (6), where (c) represents the distance between point 504o and 508o.

$$\vec{r} = (c,0,0) \quad \text{Equation (6)}$$

Combining equation (6) (e.g., where $r_y = r_z = 0$) with equations (2), (3), and (4) can yield the following equations, which can represent a solvable system along two axes of rotation.

$$0 = (a_{xIMU\,506} - a_{xIMU\,502}) - r_x(\omega_y^2 + \omega_z^2) \quad \text{Equation (7)}$$

$$r_x \alpha_z = (a_{yIMU\,506} - a_{yIMU\,502}) + r_x(\omega_x \omega_y) \quad \text{Equation (8)}$$

$$-r_x \alpha_y = (a_{zIMU\,506} - a_{zIMU\,502}) + r_x(\omega_x \omega_z) \quad \text{Equation (9)}$$

Solving for angular acceleration ($\vec{\alpha}$) can then yield the following two equations.

$$a_z = \frac{(a_{yIMU506} - a_{yIMU502})}{r_x} + (\omega_x \omega_y) \quad \text{Equation (10)}$$

$$a_y = \frac{(a_{zIMU502} - a_{zIMU506})}{r_x} - (\omega_x \omega_z) \quad \text{Equation (11)}$$

Accordingly, angular acceleration ($\vec{\alpha}$) can be calculated (at least relative to two axes) using equations (10) and (11) with IMU 502 and IMU 506 if IMUs 502 and 506 are configured to measure linear acceleration ($\vec{a}$) and angular velocity ($\vec{\omega}$), and if IMU 502 and IMU 506 share one coincident measurement axis (e.g., measurement axes 504x and 508x along axis 510).

Although FIG. 5 depicts a particular orientation of IMU 502 and IMU 506, it is contemplated that any orientation can be suitable for techniques and methods disclosed herein. For example, although IMU 506 is depicted as completely horizontally across IMU 502, IMU 506 could also be oriented vertically above IMU 502 or generally at any known angle from IMU 502. In some embodiments, IMU 502 and IMU 506 can be oriented such that they share at least one coincident measurement axis regardless of relative locations. In some embodiments, non-vertical alignments (e.g., a horizontal alignment depicted in FIG. 5) can be preferred because a vertical alignment may yield unobservable angular acceleration about a yaw axis. This can be undesirable because gravity may not be observable about a yaw axis, unlike other axes (e.g., pitch or roll). In some embodiments, it may be desirable to place IMU 502 and IMU 506 as far apart as possible (e.g., at the farthest points of MR system 500 along axis 510) while still maintaining coincident measurement axes. For example, as $r_x$ approaches 0, errors in measurements may become magnified. In some embodiments, it may be desirable to place IMU 502 and IMU 506 near one or more cameras of MR system 500. This can increase accuracy for SLAM calculations by combining visual information captured by cameras with inertial information captured by IMU 502 and IMU 506.

Calculating angular acceleration can be beneficial to SLAM calculations for mixed reality in several ways. For example, angular acceleration can be used to calculate a more accurate pre-integration term for IMU measurements. Pre-integrating IMU measurements can include determining a single relative motion constraint from a series of inertial measurements obtained from the IMU. It may be desirable to pre-integrate IMU measurements to reduce the computational complexity of integrating the entire series of inertial measurements. For example, inertial measurements collected between sequential frames (which can also be keyframes) captured in a video recording may include data about the entire path traveled by the IMU. Keyframes can be specially selected frames based on time (e.g., time since previous keyframe selection), identified features (e.g., having sufficient new identified features when compared to previous keyframe), or other criteria. However, in some embodiments, SLAM methods may only need data about the starting point (e.g., at the first frame) and the ending point (e.g., at the second frame). In some embodiments, SLAM methods may only need data about a current point in time (e.g., the most recent frame) and a previous state (e.g., the previous frame). SLAM computations may be simplified by pre-integrating inertial measurement data to produce a single relative motion constraint (e.g., from the first frame to the second frame).

Figure 6A:
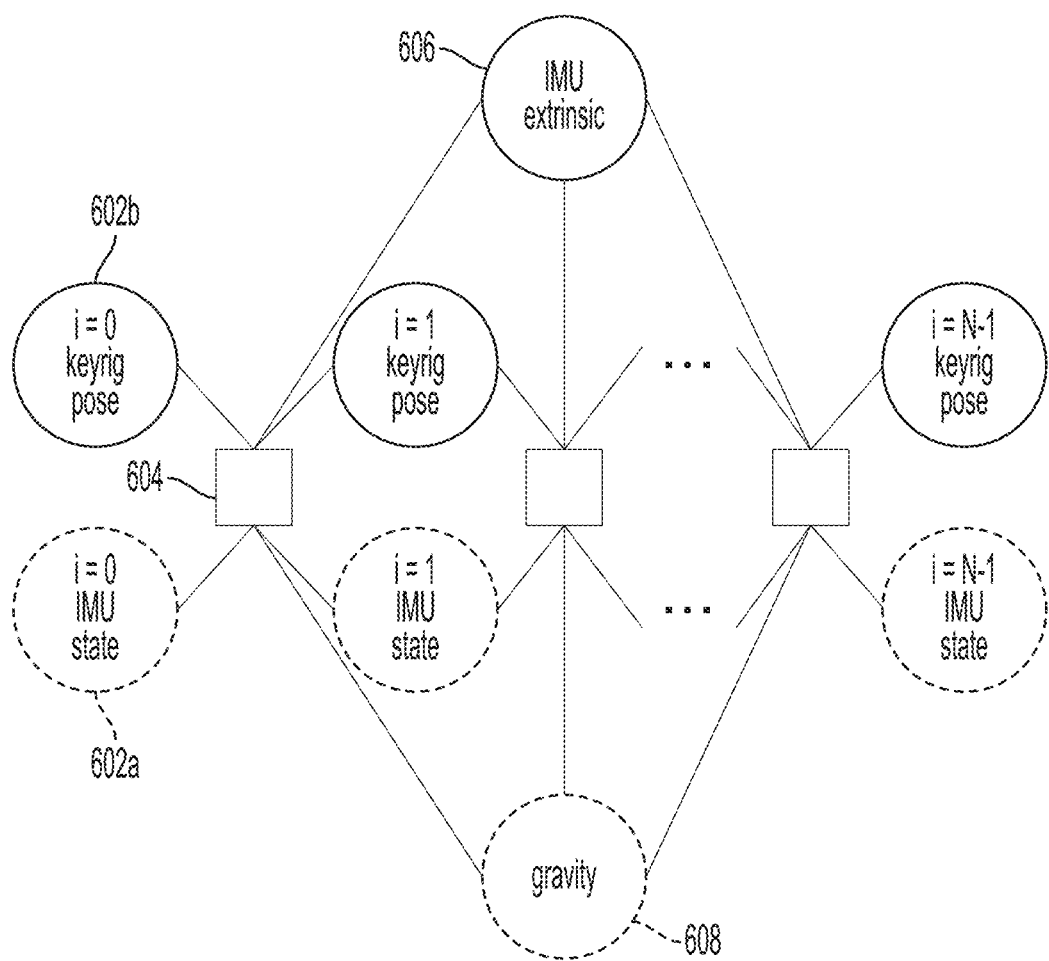
FIG. 6A illustrates an exemplary graph of SLAM calculations, according to embodiments of the disclosure.

FIG. 6A illustrates an exemplary graph of SLAM calculations. The exemplary graph can visually depict a non-linear factorization of functions of several variables. For example, variables (e.g., 602a and 602b) can be represented as circular nodes, and functions of variables (e.g., 604, also called factors) can be represented as square nodes. Each factor can be a function of any attached variables. Nodes 602a and 602b can represent data associated with a keyrig captured at time i=0. In some embodiments, a keyrig can include a set of keyframes from a multi-camera system (e.g., a MR system with two or more cameras), which may have been captured at a certain time. Keyrigs can be selected based on any criteria. For example, keyrigs can be selected in the time-domain based on elapsed time between keyrigs (e.g., one frame every half-second can be selected as a keyrig). In another example, keyrigs can be selected in the spatial-domain based on identified features (e.g., a frame can be selected as a keyrig if it has sufficiently similar or different features as compared to the previous keyrig). Keyrigs can be stored and saved to memory. It can be beneficial to use keyrigs for SLAM calculations because the use of keyrigs can lead to sparser data over longer timeframes without increasing computational load (e.g., it may not be computationally feasible to perform SLAM calculations on each frame recorded by a camera).

Node 602a can include data representing an IMU state, which can include a linear acceleration measurement, an angular velocity measurement, and one or more estimates of errors in the IMU measurements (e.g., bias) at a given time. A bias can include an offset between a measured value and an expected value (e.g., when there is no acceleration, but an accelerometer records a value of 0.2, 0.2 can be considered the accelerometer's bias). Node 602b can include data representing a keyrig pose associated with a particular keyrig. The keyrig pose can be based on the output of the bundle adjustment. Node 606 can include data representing IMU extrinsics (which can correspond to a precision and orientation of the IMU with respect to a mixed reality system), and node 608 can include a gravity estimate (which can include an estimated direction and/or magnitude of a gravity vector). Node 604 can include an IMU term edge, which can include a pre-integration term. Node 604 can also define an error function relating other attached nodes to each other. A pre-integration term can relate measured values (e.g., linear acceleration and/or angular velocity) with state variables. In some embodiments, a system state can include nodes 602a and/or 602b. A system state can be defined as a location of a MR system, a quaternion (which may represent a rotation and/or orientation of a MR system), a velocity (which may include linear and/or angular velocity), a bias of one or more accelerometers, and/or a bias of one or more gyroscopes. In some embodiments, angular acceleration data can be used to calculate a more accurate pre-integration term.

Figure 6B:
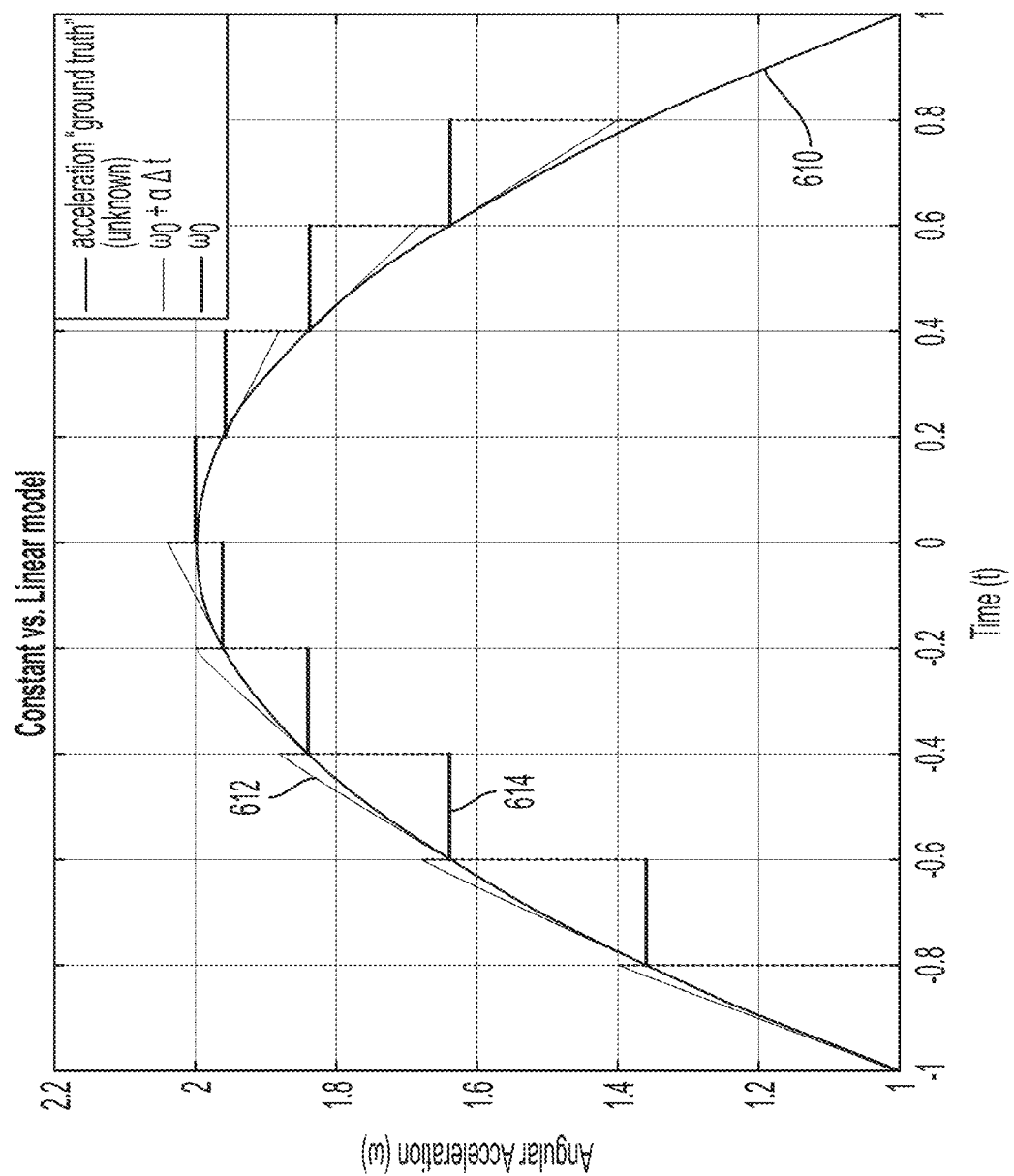
FIG. 6B illustrates an exemplary graph of angular velocity over time, according to embodiments of the disclosure.

FIG. 6B illustrates an exemplary visualization of benefits to including angular acceleration in a pre-integration term, according to some embodiments. In FIG. 6B, curve 610 can represent a ground truth angular acceleration over time. This can be, for example, a ground truth angular acceleration for MR system 500 as a user walks around an environment. It can be desirable to capture information about curve 610 as accurately as possible. Measurement 614 can represent a measured value of angular velocity at time t=−0.6. In some embodiments, measurement 614 can be directly output from IMU 502 and/or IMU 506. However, measurement 614 may not accurately represent curve 610 between sample rates (e.g., FIG. 6B depicts a sample rate of one sample per 0.2 units of time) because curve 610 may rapidly change angular velocity between samples.

Measurement 612 can represent angular velocity that includes an angular acceleration term. For example, measurement 612 may directly obtain an angular velocity at time t=−0.6 from IMU 502 and calculate an angular acceleration at that time using techniques described herein. The angular acceleration can then be used to create a more accurate angular velocity estimate between samples (e.g., because the measurement 612 more closely tracks curve 610 than measurement 614; measurement 612 may be a slope of the curve 610 at a particular time). Because angular velocity may be more accurately estimated, a sampling rate of curve 610 may be reduced.

Equations (12), (13), and (14) can represent components of a pre-integration term, which may relate two system states with IMU sensor data captured between the two system states. In some embodiments, equations (12), (13), and (14) need not include an angular acceleration term. Specifically, equation (12) can relate two quaternions (e.g., two system rotation states) to each other, where ($b^g$) can represent a bias value of a gyroscope.

$$\Delta \tilde{R}_{ij} = \prod_{k=i}^{j-1} \text{Exp}((\tilde{\omega}_k - b_k^g)\Delta t) \quad \text{Equation (12)}$$

Equation (13) can relate two velocity estimates (e.g., linear velocity measurements) to each other, where ($b^a$) can represent a bias value of a linear accelerometer.

$$\Delta \tilde{v}_{ij} = \sum_{k=i}^{j-1} \Delta \tilde{R}_{ij}(\tilde{a}_k - b_i^a)\Delta t \quad \text{Equation (13)}$$

Equation (14) can relate two location estimates (e.g., locations in three-dimensional space) to each other.

$$\Delta \tilde{p}_{ij} = \sum_{k=i}^{j-1} \Delta \tilde{v}_{ij}\Delta t + \frac{1}{2}\Delta \tilde{R}_{ij}(\tilde{a}_k - b_i^a)\Delta t^2 \quad \text{Equation (14)}$$

In some embodiments, equation (15) can replace equation (12) as part of a pre-integration term relating two quaternions. Equation (15) may yield more accurate SLAM estimates, for example, because it includes an angular acceleration term, which may be calculated, as described herein.

$$\Delta \tilde{R}_{ij} = \prod_{k=i}^{j-1} \text{Exp}\left(\left(\tilde{\omega}_k - b_k^g + \frac{1}{2}\alpha\Delta t\right)\Delta t\right) \quad \text{Equation (15)}$$

In some embodiments, including the $$\left(\frac{1}{2}\alpha\Delta t\right)$$

term can yield a more accurate ($\Delta \tilde{R}_{ij}$) term, which may propagate through the other pre-integration terms. More accurate pre-integration terms can yield better SLAM results (e.g., MR system 500 may more accurately identify its position while simultaneously mapping its environment). This can yield less jitter and/or drift in virtual objects.

In some embodiments, an angular acceleration can also be used to reduce a perceived latency by a user of a MR system by pre-rendering virtual objects. As shown in FIG. 6B, an angular acceleration term may more accurately track and/or predict a future movement and/or position of a MR system. If MR system 500 is able to predict where a user will be looking in the near future, MR system 500 may render virtual content before it needs to enter the user's field of view. For example, based on a current position and/or trajectory of MR system 500, MR system 500 may predict its future position. MR system 500 may then determine what virtual content will be visible at the future position and begin rendering the virtual content before it reaches the future position. With a pre-rendering pipeline, MR system 500 may be able to display virtual content instantly (or near instantly) as it enters the user's field of view, instead of waiting to display the virtual content as it is being rendered on an as-needed basis.

Figure 7:
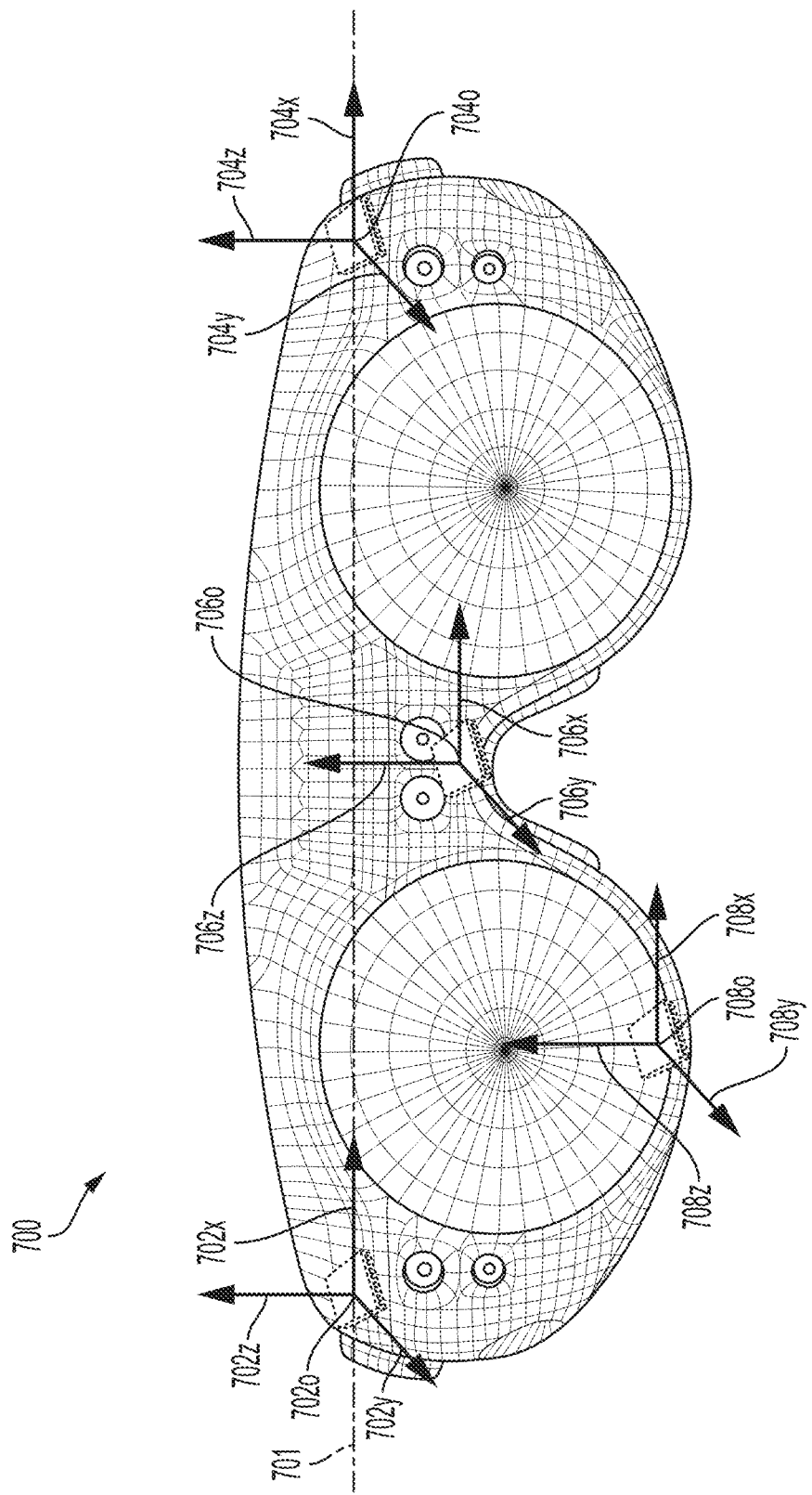
FIG. 7 illustrates an exemplary IMU configuration, according to embodiments of the disclosure.

FIG. 7 illustrates an exemplary MR system with more than two IMUs, according to some embodiments. Additional IMUs can offer several benefits, for example resolution of angular acceleration along three axes (instead of two), and/or noise reduction/error mitigation. In some embodiments, the placement and orientation of two IMUs at positions 702o and 704o may allow for the calculation of angular acceleration about any axis except axis 701. In some embodiments, additional sensors may be added to MR system 700 (which can correspond to MR systems 112, 200, 500), which may allow for resolution of angular acceleration about axis 701 as well. For example, a third IMU may be placed at position 706o. The IMU placed at position 706o need not share a coincident measurement axis with either IMU placed at position 702o or 704o. In some embodiments, a third IMU may allow for full resolution of angular acceleration using equations (2), (3), and (4). It can be beneficial to place a third IMU as far from the other two IMUs as possible, because a smaller ($\vec{r}$) vector may magnify measurement errors.

In some embodiments, a third IMU can be placed at position 708o. This placement relative to positions 702o and 704o can be advantageous because it is further away from the other two IMUs, yielding a larger ($\vec{r}$) vector. Although references are made to a third IMU, it is contemplated that any number of one, two, three, four, or more IMUs may be used. In some embodiments, additional and/or redundant IMU sensors may be advantageously leveraged for error detection (e.g., detecting when one or more IMUs are measuring incorrect values), noise reduction, etc.

It is understood that the placements and number of the IMUs illustrated in FIG. 7 are not meant to be limiting. For example, the IMUs may be placed to maximize accuracy for deriving angular acceleration for a number N of IMUs.

Figure 8:
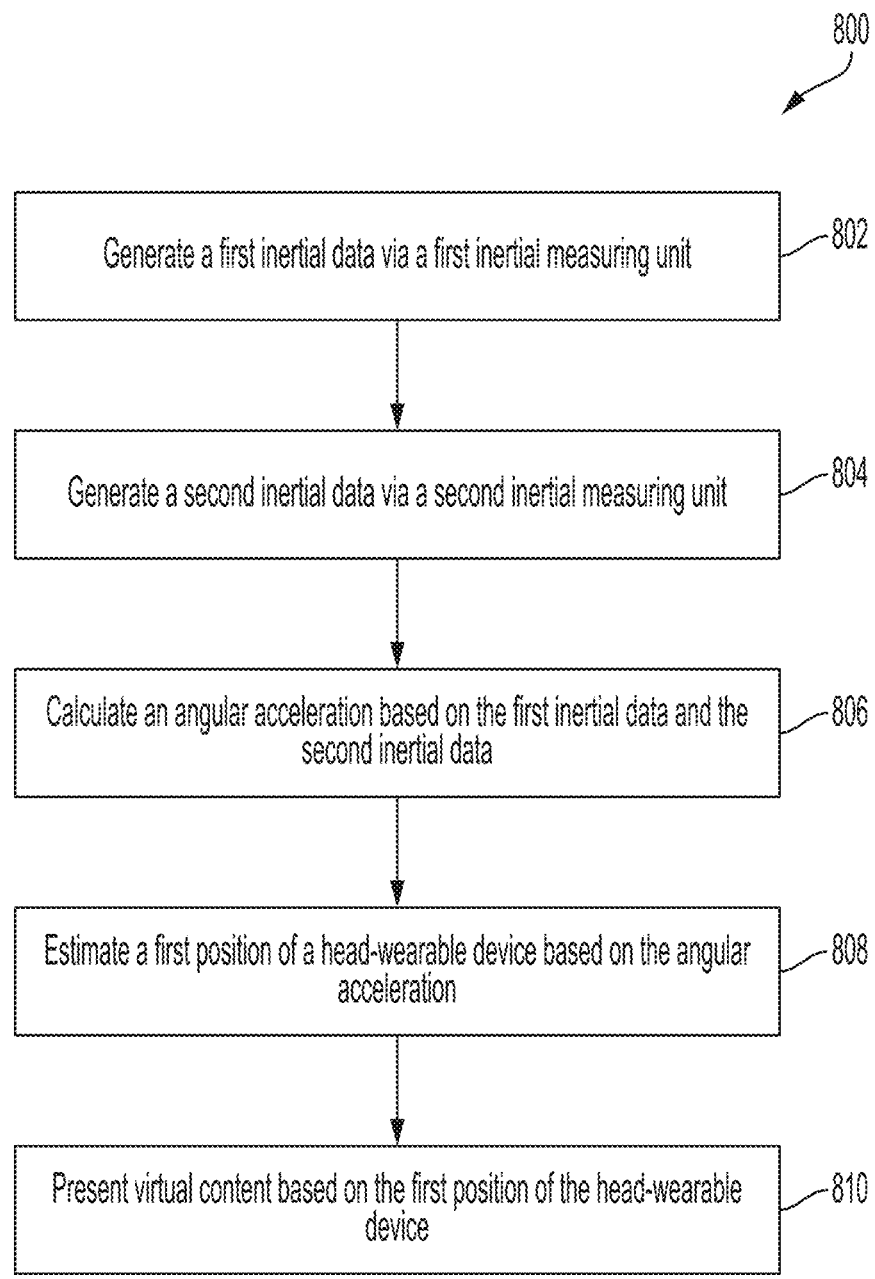
FIG. 8 illustrates an exemplary process for presenting virtual content, according to embodiments of the disclosure.

FIG. 8 illustrates an exemplary process 800 for leveraging angular acceleration for mixed reality SLAM, according to some embodiments. At step 802, a first inertial data is generated via a first inertial measuring unit (e.g. an IMU described with respect to FIG. 5 or 7), which may include three measurement axes. In some embodiments, the first inertial measuring unit can be placed near a proximal end of a wearable head device (and/or near a camera of a wearable head device). In some embodiments, a first inertial measuring unit may be integrated into a wearable head device of a MR system. In some embodiments, a first inertial data can include linear acceleration (e.g., along three measurement axes) and angular velocity (e.g., along three measurement axes). In some embodiments, a first inertial data can include linear velocity (e.g., along three measurement axes). In some embodiments, a first inertial data can include angular acceleration (e.g., along three measurement axes).

At step 804, a second inertial data is generated via a second inertial measuring unit (e.g. an IMU described with respect to FIG. 5 or 7), which may include three measurement axes. In some embodiments, a second inertial measuring unit may be integrated into a wearable head device of a MR system. In some embodiments, the second inertial measuring unit may be configured such that one measurement axis is coincident with a measurement axis of the first inertial measuring unit. In some embodiments, the second inertial measuring unit may be placed near a distal end of a wearable head device (and/or near a camera of a wearable head device). The second inertial measuring unit may be separated from the first inertial measuring unit by a distance of approximately four to eight inches and may be substantially rigidly coupled to the first inertial measuring unit. In some embodiments, a second inertial data can include linear acceleration (e.g., along three measurement axes) and angular velocity (e.g., along three measurement axes). In some embodiments, a second inertial data can include linear velocity (e.g., along three measurement axes). In some embodiments, a second inertial data can include angular acceleration (e.g., along three measurement axes).

At step 806, an angular acceleration can be calculated based on the first inertial data and the second inertial data. In some embodiments, the angular acceleration can be calculated, as described herein, via one or more processors integrated into a wearable head device of a MR system. In some embodiments, the angular acceleration can be calculated via one or more processors integrated into an auxiliary device (e.g., a belt pack and/or auxiliary unit 320) of a MR system. In some embodiments, the angular acceleration can be calculated using a second device (e.g., a cloud computing device), different from the MR system or the auxiliary device. In some embodiments, the angular acceleration can be calculated along two measurement axes of the first inertial measurement unit and/or the second inertial measurement unit. In some embodiments, the angular acceleration need not be calculated along a measurement axis coincident between the first inertial measurement unit and the second inertial measurement unit (e.g., IMU located at position 702o or 704o and IMU located at position 706o or 708o).

At step 808, a first position of a wearable head device can be estimated based on the angular acceleration. For example, measurement 612 (e.g., angular acceleration) may be used to estimate curve 610 at particular times. In some embodiments, the first position may be estimated via one or more processors integrated into a wearable head device of a MR system. In some embodiments, the first position may be estimated via one or more processors integrated into an auxiliary device of a MR system. In some embodiments, a first position of a wearable head device can be estimated using SLAM. In some embodiments, the first position may be estimated using one or more pre-integration terms, which may include an angular acceleration term.

At step 810, virtual content can be presented based on the first position of the wearable head device. For example, based on the first position of the In some embodiments, virtual content can be presented via one or more transmissive displays of the wearable head device. In some embodiments, a MR system may determine a user's field of view based on the first position (which can include location and/or orientation data), and virtual content can be presented if it is located within the user's field of view. In some embodiments, a MR system may predict a future position of the wearable head device using the first position and the angular acceleration. For example, a future position can be predicted based on a current position (e.g., a first position) and a trajectory (which may be based on angular acceleration). In some embodiments, virtual content can be generated based on the future position and/or a user's field of view at the future position.

According to some embodiments, a system comprises: a first inertial measurement unit; a second inertial measurement unit; and one or more processors configured to execute a method comprising: receiving first inertial data via the first inertial measurement unit; receiving second inertial data via the second inertial measurement unit; calculating an angular acceleration based on the first inertial data and based further on the second inertial data; estimating a first position of a wearable head device based on the angular acceleration; and presenting virtual content based on the first position of the wearable head device.

According to some embodiments, the first inertial measurement unit and the second inertial measurement unit share a coincident measurement axis.

According to some embodiments, the system further comprises a third inertial measurement unit that does not share the coincident measurement axis with the first inertial measurement unit and the second inertial measurement unit.

According to some embodiments, the method further comprises: generating third inertial data via the third inertial measurement unit, wherein the angular acceleration is calculated further based on the third inertial data.

According to some embodiments, estimating the first position of the wearable head device based on the angular acceleration comprises calculating a pre-integration term based on the angular acceleration.

According to some embodiments, the pre-integration term relates a first state of the wearable head device to a second state of the wearable head device, and wherein each state comprises respective position data, respective velocity data, respective accelerometer bias data, and respective gyroscope bias data.

According to some embodiments, the method further comprises: predicting a future position of the wearable head device based on the angular acceleration and based further on the first position of the wearable head device; and updating presentation of the virtual content based on the future position of the wearable head device.

According to some embodiments, a method comprises: receiving first inertial data via a first inertial measurement unit; receiving second inertial data via a second inertial measurement unit; calculating an angular acceleration based on the first inertial data and based further on the second inertial data; estimating a first position of a wearable head device based on the angular acceleration; and presenting virtual content based on the first position of the wearable head device.

According to some embodiments, the first inertial measurement unit and the second inertial measurement unit share a coincident measurement axis.

According to some embodiments, the method further comprises generating third inertial data via a third inertial measurement unit that does not share the coincident measurement axis with the first inertial measurement unit and the second inertial measurement unit.

According to some embodiments, the angular acceleration is calculated further based on the third inertial data.

According to some embodiments, estimating the first position of the wearable head device based on the angular acceleration comprises calculating a pre-integration term based on the angular acceleration.

According to some embodiments, the pre-integration term relates a first state of the wearable head device to a second state of the wearable head device, and wherein each state comprises respective position data, respective velocity data, respective accelerometer bias data, and respective gyroscope bias data.

According to some embodiments, the method further comprises: predicting a future position of the wearable head device based on the angular acceleration and based further on the first position of the wearable head device; and updating presentation of the virtual content based on the future position of the wearable head device.

According to some embodiments, a non-transitory computer-readable medium storing one or more instructions, which, when executed by one or more processors of an electronic device, cause the one or more processors to perform a method comprising: receiving first inertial data via a first inertial measurement unit; receiving second inertial data via a second inertial measurement unit; calculating an angular acceleration based on the first inertial data and based further on the second inertial data; estimating a first position of a wearable head device based on the angular acceleration; and presenting virtual content based on the first position of the wearable head device.

According to some embodiments, the first inertial measurement unit and the second inertial measurement unit share a coincident measurement axis.

According to some embodiments, the method further comprises generating third inertial data via a third inertial measurement unit that does not share the coincident measurement axis with the first inertial measurement unit and the second inertial measurement unit.

According to some embodiments, the angular acceleration is calculated further based on the third inertial data.

According to some embodiments, estimating the first position of the wearable head device based on the angular acceleration comprises calculating a pre-integration term based on the angular acceleration.

According to some embodiments, the pre-integration term relates a first state of the wearable head device to a second state of the wearable head device, and wherein each state comprises respective position data, respective velocity data, respective accelerometer bias data, and respective gyroscope bias data.

According to some embodiments, the method further comprises: predicting a future position of the wearable head device based on the angular acceleration and based further on the first position of the wearable head device; and updating presentation of the virtual content based on the future position of the wearable head device.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
   a first inertial measurement unit;
   a second inertial measurement unit; and
   one or more processors configured to execute a method comprising:
      receiving first inertial data via the first inertial measurement unit;
      receiving second inertial data via the second inertial measurement unit;
      calculating an angular acceleration based on the first inertial data and based further on the second inertial data;
      estimating a first position of a wearable head device based on the angular acceleration, wherein estimating the first position of the wearable head device based on the angular acceleration comprises calculating a pre-integration term based on the angular acceleration; and
      presenting virtual content based on the first position of the wearable head device.

2. The system of claim 1, wherein the first inertial measurement unit and the second inertial measurement unit share a coincident measurement axis.

3. The system of claim 2, further comprising a third inertial measurement unit that does not share the coincident measurement axis with the first inertial measurement unit and the second inertial measurement unit.

4. The system of claim 3, wherein the method further comprises:
   generating third inertial data via the third inertial measurement unit,
   wherein the angular acceleration is calculated further based on the third inertial data.

5. The system of claim 1, wherein the pre-integration term relates a first state of the wearable head device to a second state of the wearable head device, and wherein each of the first state and the second state comprises respective position data, respective velocity data, and bias data associated with the first inertial measurement unit or the second inertial measurement unit.

6. The system of claim 1, wherein the method further comprises:
predicting a future position of the wearable head device based on the angular acceleration and based further on the first position of the wearable head device; and
updating presentation of the virtual content based on the future position of the wearable head device.

7. A method comprising:
receiving first inertial data via a first inertial measurement unit;
receiving second inertial data via a second inertial measurement unit;
calculating an angular acceleration based on the first inertial data and based further on the second inertial data;
estimating a first position of a wearable head device based on the angular acceleration wherein estimating the first position of the wearable head device based on the angular acceleration comprises calculating a pre-integration term based on the angular acceleration; and
presenting virtual content based on the first position of the wearable head device.

8. The method of claim 7, wherein the first inertial measurement unit and the second inertial measurement unit share a coincident measurement axis.

9. The method of claim 8, further comprising generating third inertial data via a third inertial measurement unit that does not share the coincident measurement axis with the first inertial measurement unit and the second inertial measurement unit.

10. The method of claim 9, wherein the angular acceleration is calculated further based on the third inertial data.

11. The method of claim 7, wherein the pre-integration term relates a first state of the wearable head device to a second state of the wearable head device, and wherein each of the first state and the second state comprises respective position data, respective velocity data, and bias data associated with the first inertial measurement unit or the second inertial measurement unit.

12. The method of claim 7, further comprising:
predicting a future position of the wearable head device based on the angular acceleration and based further on the first position of the wearable head device; and
updating presentation of the virtual content based on the future position of the wearable head device.

13. A non-transitory computer-readable medium storing one or more instructions, which, when executed by one or more processors of an electronic device, cause the one or more processors to perform a method comprising:
receiving first inertial data via a first inertial measurement unit;
receiving second inertial data via a second inertial measurement unit;
calculating an angular acceleration based on the first inertial data and based further on the second inertial data;
estimating a first position of a wearable head device based on the angular acceleration wherein estimating the first position of the wearable head device based on the angular acceleration comprises calculating a pre-integration term based on the angular acceleration; and
presenting virtual content based on the first position of the wearable head device.

14. The non-transitory computer-readable medium of claim 13, wherein the first inertial measurement unit and the second inertial measurement unit share a coincident measurement axis.

15. The non-transitory computer-readable medium of claim 14, wherein the method further comprises generating third inertial data via a third inertial measurement unit that does not share the coincident measurement axis with the first inertial measurement unit and the second inertial measurement unit.

16. The non-transitory computer-readable medium of claim 13, wherein the pre-integration term relates a first state of the wearable head device to a second state of the wearable head device, and wherein each of the first state and the second state comprises respective position data, respective velocity data, and bias data associated with the first inertial measurement unit or the second inertial measurement unit.

17. The non-transitory computer-readable medium of claim 13, wherein the method further comprises:
predicting a future position of the wearable head device based on the angular acceleration and based further on the first position of the wearable head device; and
updating presentation of the virtual content based on the future position of the wearable head device.

* * * * *

UNITED STATES PATENT AND TRADEMARK OFFICE
CERTIFICATE OF CORRECTION

PATENT NO. : 11,561,613 B2
APPLICATION NO. : 17/332917
DATED : January 24, 2023
INVENTOR(S) : Arnau Franci Rodon It is certified that error appears in the above-identified patent and that said Letters Patent is hereby corrected as shown below:

In the Claims

At Column 27, Claim number 7, Line number 20, delete "acceleration" and insert -- acceleration, --.

At Column 28, Claim number 13, Line number 15, delete "acceleration" and insert -- acceleration, --.

Signed and Sealed this
Eighteenth Day of April, 2023

Katherine Kelly Vidal
*Director of the United States Patent and Trademark Office*